UNITED STATES PATENT OFFICE.

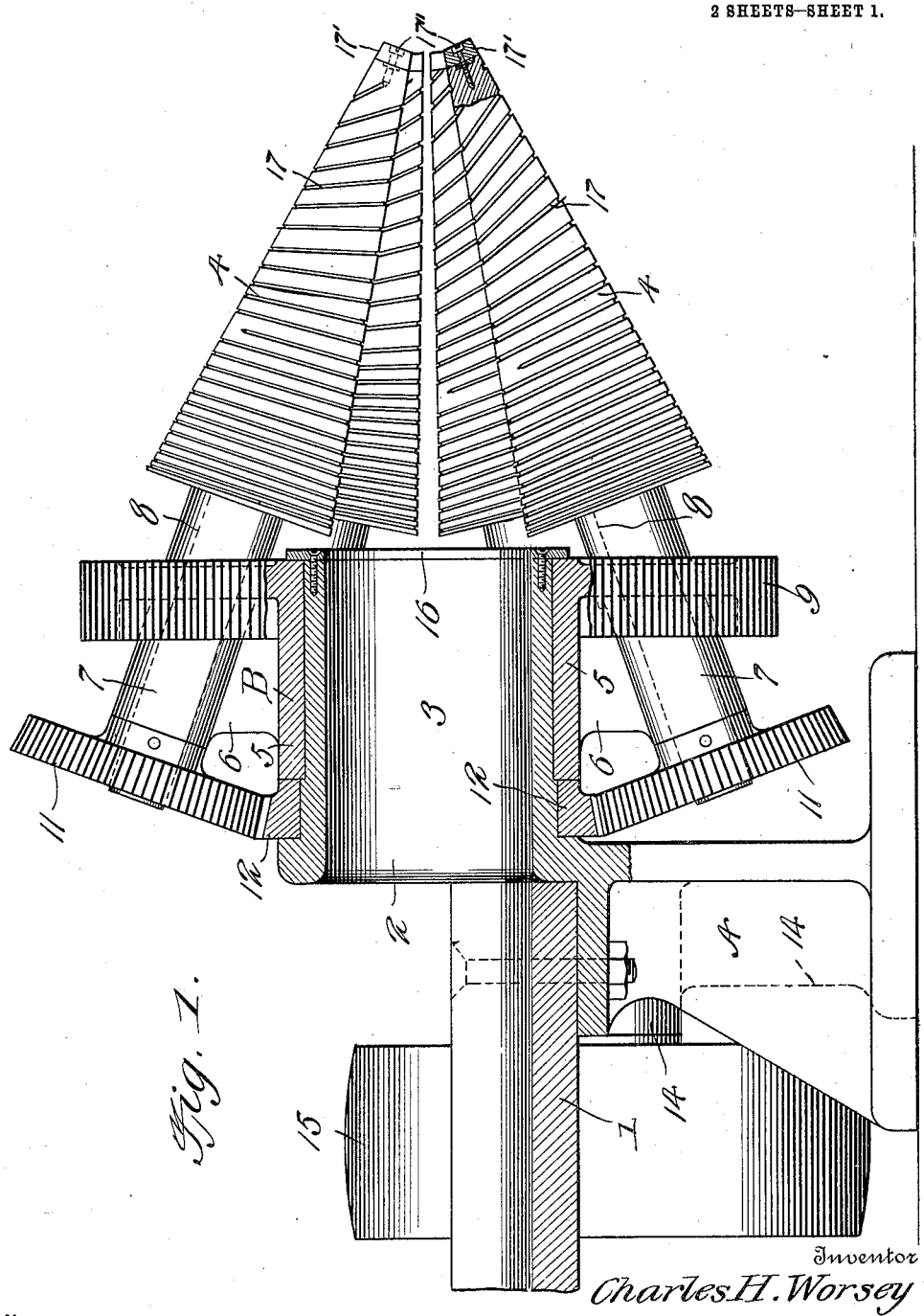

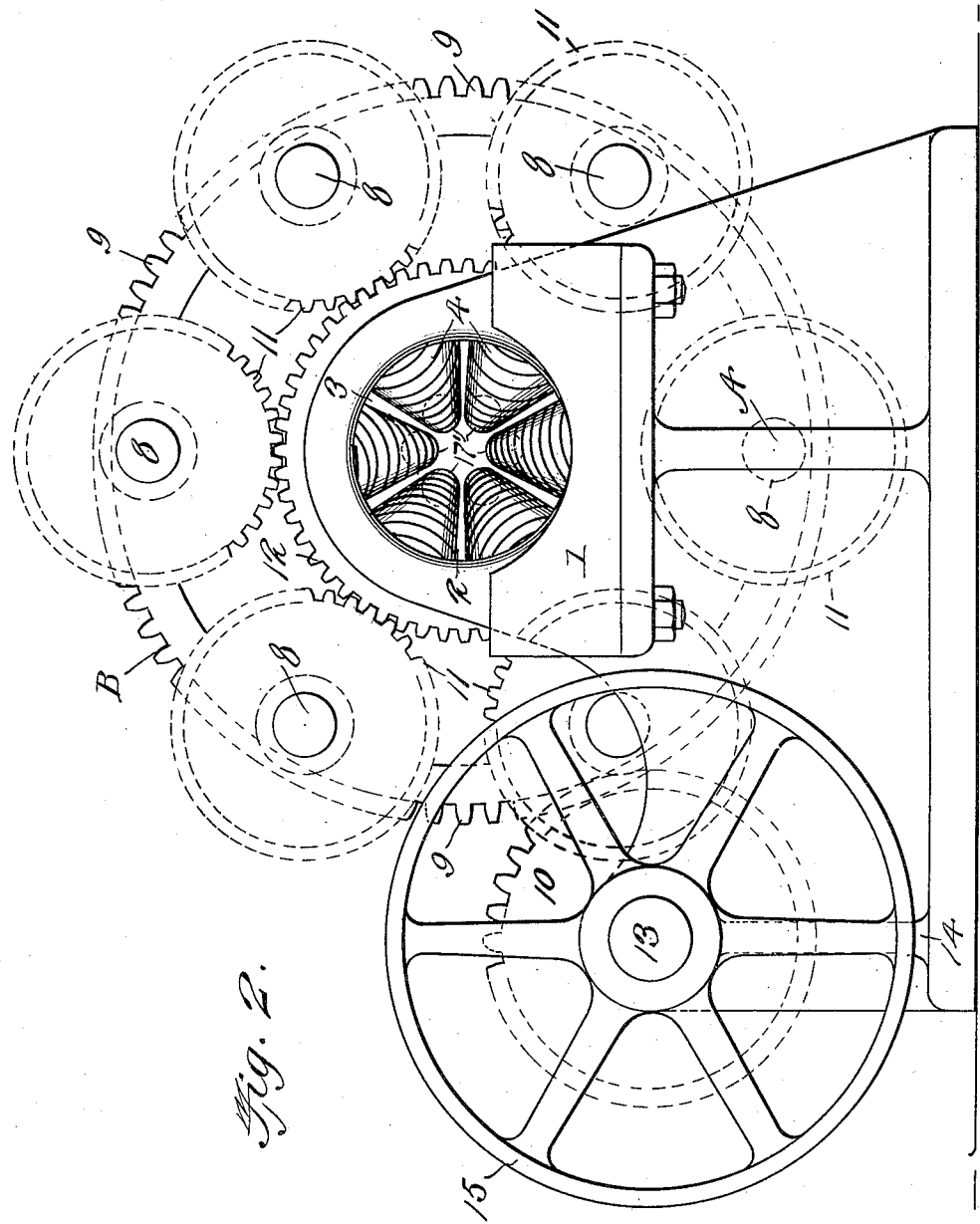

CHARLES H. WORSEY, OF WILKINSBURG, PENNSYLVANIA, ASSIGNOR TO E. R. KNOTT MACHINE COMPANY, OF BOSTON, MASSACHUSETTS, A CORPORATION OF MASSACHUSETTS.

CANDY-SPINNING MACHINE.

1,102,623.         Specification of Letters Patent.    Patented July 7, 1914.

Application filed April 6, 1910. Serial No. 553,760.

*To all whom it may concern:*

Be it known that I, CHARLES H. WORSEY, a citizen of the United States, residing at Wilkinsburg, in the county of Allegheny and State of Pennsylvania, have invented new and useful Improvements in Candy-Spinning Machines, of which the following is a specification.

This invention relates to a candy making machine of the spinning type for producing stick candy from the bulk or dough.

The invention has for one of its objects the improvement and simplification of the construction and operation of machines of this character so as to be comparatively simple and inexpensive to manufacture, reliable and efficient in use, and capable of making a superior product.

Another object of the invention is the provision of a novel arrangement of cones which revolve about a common axis and simultaneously rotate on their respective axes in order to feed the candy uniformly through the machine.

Another object of the invention is to provide a novel arrangement of spiral grooves in the conical rollers, whereby the candy will be fed in such a manner that the resulting stick will be circular, of uniform diameter at all points and of uniform mass.

With these objects in view and others as will appear as the description proceeds, the invention comprises the various novel features of construction and arrangement of parts which will be more fully described hereinafter and set forth with particularity in the claims appended hereto.

In the accompanying drawings which illustrate one embodiment of the invention:—Figure 1 is a vertical longitudinal section of the machine. Fig. 2 is an end view thereof.

Similar reference characters are employed to designate corresponding parts throughout the several views.

Referring to the drawings, A designates the frame of the machine which supports a table 1 on which the dough or mass of candy is supported in feeding relation to the machine and in front of the mouth 2 of a circular guide 3 through which the candy is drawn by the rolls 4. This guide 3 is disposed with its axis horizontal and is of cylindrical form, the same forming a bearing for a rotary carrier B. This carrier is provided with a hub 5 from which project arms 6 that are formed with bearings 7 for receiving the shafts 8 of the cones or rollers 4. On the carrier are gear teeth 9 with which meshes a pinion 10 for rotating the carrier. On each shaft 8 is a gear 11 which meshes with a fixed circular rack 12 secured to the portion 3 of the frame A, and hence, as carrier B rotates and carries the cones with it, it is obvious that the cones will rotate on their individual axes by their pinions meshing with the circular rack 12. The pinion 10 is secured to a drive shaft 13 mounted in a bearing 14 on the frame A and this shaft may be driven in any suitable manner, as for instance by a belt pulley 15 secured thereto. The rotary carrier B is held on the hollow bearing 3 by a ring 16 secured to the bearing to form a flange that engages the hub of the carrier to prevent longitudinal movement thereof.

The rolls 4 are arranged with their axes converging to a common point which is coincident with the axis of the combined guide and bearing 3 and these rolls are conical and taper in the same direction in which they converge. Each roller is provided with one or more spiral grooves 17 which control the feed of the candy and determine the drawing action on the mass of candy confined between the rolls. The pitch of the groove 17 is determined by the circumferential dimensions at different points along the roll. In the present construction each roll has an area twenty-two times greater at its larger end than at its smaller end and the pitch or angle of the groove is twenty-two times less at the large end than at the small end. By this arrangement, the mass of candy is carried forwardly without crowding or slipping. With the rolls designed as shown in the drawings, one revolution of the rolls causes four inches of candy to be forced out in stick form, the pitch of the groove at the points of the rolls making one turn in two inches and, since the rolls are rotating simultaneously about a common axis and about their own axes, such a pitch will cause four inches of candy to be forced out with each revolution.

The machine is designed for three hundred R. P. M. and in actual practice it has an output of from fifteen to twenty pounds of candy per minute.

In order to make the candy into sticks of different diameters, the rolls have removable tips 17′ held in place by screws 17″, and hence by lengthening or shortening the rolls by interchangeable tips, the opening between the outer ends of the rolls will be made smaller or larger.

From the foregoing description taken in connection with the accompanying drawings, the advantages of the construction and of the method of operation will be readily apparent to those skilled in the art to which the invention appertains, and while I have described the principle of operation of the invention together with the apparatus which I now consider to be the best embodiment thereof, I desire to have it understood that the apparatus shown is merely illustrative and that such changes may be made when desired as are within the scope of the appended claims.

Having thus described the invention, what is claimed as new is:—

1. An apparatus of the class described comprising a combined stationary candy guide and bearing, a rotary carrier surrounding and revolving on the bearing, a plurality of conical combined reducing and drawing rolls mounted on the carrier and converging to a common point, and means for rotating the rolls as they rotate with the carrier.

2. An apparatus of the class described comprising a stationary tubular candy guide forming a bearing, a carrier rotatably mounted on the bearing, a plurality of shafts mounted on the carrier and converging to a common point, combined reducing and drawing rolls mounted on the shafts, pinions on the shafts, and a fixed circular gear with which all the pinions mesh for causing the rotation of the rolls through the rotation of the carrier.

3. An apparatus of the class described comprising a stationary cylindrical candy guide, a carrier rotatably mounted on and surrounding the guide, a circular rack fixed on the guide, a plurality of combined reducing and conical drawing rolls mounted on the carrier and disposed at one end of the guide with their axes extending in the general direction of travel of the candy between the rolls, pinions connected with the carrier and meshing with the circular rack, and means for rotating the carrier.

4. A drawing roll for candy machines comprising a combined drawing and reducing cone, and means of uniform varying pitch extending spirally around the cone for effecting a drawing action on the candy.

5. A drawing roll for candy machines comprising a cone, and a feed groove extending spirally around the cone, said groove having a pitch varying uniformly throughout the length of the cone.

6. A drawing cone for candy machines provided with a spiral groove of greater pitch at the point of the cone than at the base thereof.

7. A drawing roll for candy machines consisting of a cone having a spiral groove, the pitch of which varies uniformly with the peripheral dimensions of the cone at different points along the axis thereof.

8. A candy machine comprising a plurality of drawing rolls mounted to rotate about a common axis and to turn about their own axes, each cone being provided with a spiral groove having a pitch which increases from the base to the point.

9. A drawing cone for candy machines provided with a spiral groove of greater pitch at the point of the cone than at the base thereof, and a removable tip at the smaller end of the cone.

10. A candy machine comprising a plurality of drawing rolls mounted to rotate about a common axis and to turn about their own axes, each cone being provided with a spiral groove having a pitch which increases from the base to the point and removable tips on the end of the rolls.

11. An apparatus of the class described comprising a stationary cylindrical candy guide, a carrier rotatably mounted on and surrounding the guide, a circular rack concentric with the guide, a plurality of combined reducing and conical drawing rolls mounted on the carrier and disposed at one end of the guide, with their axes extending in the general direction of travel of the candy between the rolls, pinions connected with the carrier and meshing with the circular rack, and means for rotating the carrier.

12. The combination of a frame provided with a horizontally disposed hollow cylindrical stationary member forming a combined bearing and candy guide, a carrier mounted on the bearing and including a plurality of bearings having their axes disposed in converging relation, shafts mounted in the bearings, conical reducing and drawing rolls mounted on the shafts, means for rotating the shafts by the rotation of the carrier, and means for rotating the carrier.

13. In a candy-making machine, a spinner comprising a nest of cones around a cone-shaped space through which the batch is fed, a carrier for said cones supporting the latter by one end only, the other end being unsupported and free, a support for said carrier, and means for rotating the carrier and for rotating the cones wholly from the large ends thereof.

14. In a candy-making machine, a spinner comprising a nest of cones around a cone-shaped space through which the batch is fed, a carrier for said cones supporting the latter by one end only, the other end being unsupported and free, a central support for said carrier constituting a non-rotating guide through which the batch enters the said space, and means for rotating the carrier and for rotating the respective cones wholly from the large ends thereof.

15. In a rotary spinner for candy-making machines, the cone having a detachable tip.

In testimony whereof I affix my signature in presence of two witnesses.

CHARLES H. WORSEY.

Witnesses:
C. MAITLAND,
H. WINDT.

Copies of this patent may be obtained for five cents each, by addressing the "Commissioner of Patents, Washington, D. C."